United States Patent [19]
Bankes
[11] 3,978,447
[45] Aug. 31, 1976

[54] SAFETY TRANSMITTING DEVICE

[75] Inventor: Frederick M. Bankes, Wyoming, Pa.
[73] Assignee: Lawrence Peska Associates, Inc., New York, N.Y. ; a part interest

[22] Filed: July 1, 1975
[21] Appl. No.: 592,274
[52] U.S. Cl. .................. 340/33; 180/98; 246/29 R
[51] Int. Cl.$^2$ .................. G08G 1/00; B60T 17/18
[58] Field of Search .................. 340/33, 47; 246/111, 246/113, 29 R; 180/98

[56] References Cited
UNITED STATES PATENTS

| | | | |
|---|---|---|---|
| 1,808,022 | 6/1931 | Prete | 340/33 |
| 1,978,286 | 10/1934 | Sommer | 340/33 |
| 2,208,016 | 7/1940 | Cowles | 246/29 R |
| 3,854,119 | 12/1974 | Friedman | 340/33 |

*Primary Examiner*—Thomas B. Habecker
*Attorney, Agent, or Firm*—Richard E. Nanfeldt

[57] ABSTRACT

A safety transmitting device for warning a motor vehicle at a railroad crossing of the approach of a train includes a tuning fork mechanically communicating with the tracks, wherein the vibrations of the tracks causes the fork to transmit sound waves. The sound waves are converted to the electro-magnetic waves by a transmitter unit. The fork and transmitter unit are positioned at a predetermined distance from the crossing. The electromagnetic waves are picked up by a receiver unit in the motor vehicle and converted to the electrical energy which causes activation of a sound device and flashing light unit in the interior of the motor vehicle as well as activation of an electrical pump in the brake line assembly of the vehicle which causes automatic slow application of the brakes.

4 Claims, 4 Drawing Figures

SAFETY TRANSMITTING DEVICE

BACKGROUND OF THE INVENTION

U.S. Pat. No. 1,612,427 employs electric waves for signaling approaching vehicles of the presence of another vehicle. The transmitting device is located on the vehicles.

U.S. Pat. No. 3,412,378 employs an electronic warning device, wherein the transmitter unit is located on the train.

U.S. Pat. No. 3,646,508 employs an optical and radio frequency signal to warn approaching motor vehicles of a disabled vehicle.

These aforementioned patents do not provide a means for stopping a vehicle approaching a railroad crossing or employs a transmitting device which communicates with the tracks.

SUMMARY OF THE INVENTION

My present invention relates to a unique and novel safety transmitting device for warning a motor vehicle at a railroad crossing of the approach of a train.

An object of my present invention is to provide a safety transmitting device which gives the driver of the motor vehicle both a visual and audio warning of an approaching train.

A further object of my present invention is to provide a device which automatically activates the brake assembly of the motor vehicle upon the approach of a train.

A still further object of my present invention is to provide a device readily adaptable to existing as well as new motor vehicles.

Another object of my present invention is to provide a device which will reduce the number of accidents between buses and trains at railroad crossings.

Briefly, my present invention comprises a tuning fork mechanically communicating with the tracks, wherein the vibrations of the tracks causes the fork to transmit sound waves. The sound waves are converted to the electro-magnetic waves by a transmitter unit. The fork and transmitter unit are positioned at a predetermined distance from the crossing. The electromagnetic waves are picked up by a receiver unit in the motor vehicle and converted to electrical energy which causes activation of a sound device and flashing light unit in the interior of the motor vehicle as well as activation of an electrical pump in the brake line assembly of the vehicle which causes automatic slow application of the brakes.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
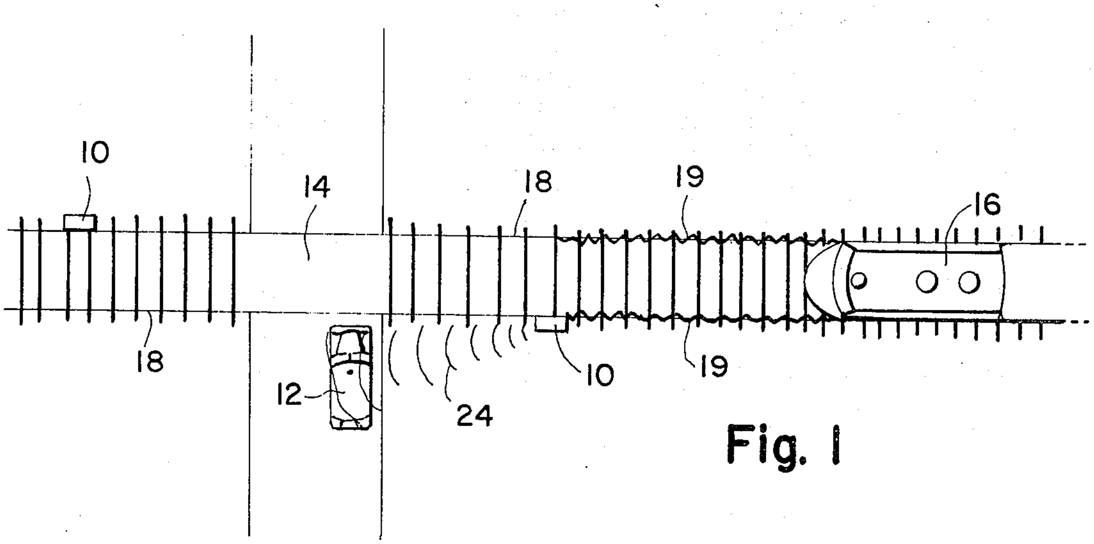
FIG. 1 illustrates a top view of a safety transmitting device mounted on a railroad track.
Figure 2:
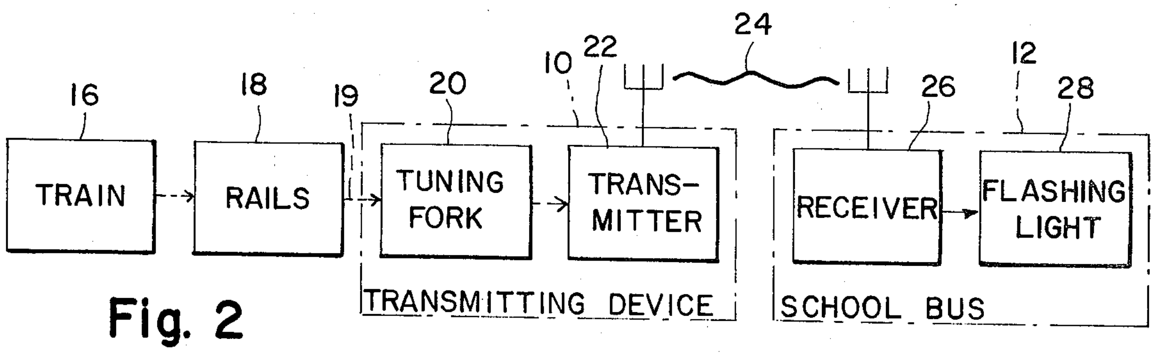
FIG. 2 illustrates a functional block diagram of the device.
Figure 3:
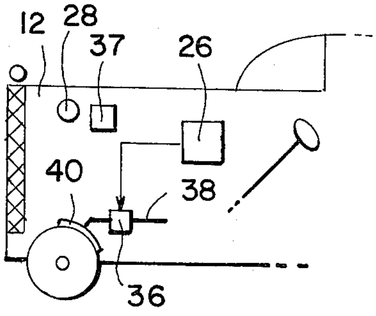
FIG. 3 illustrates a side cross sectional view of the forward portion of the vehicle.

Turning now descriptively to the drawings, in which similar reference characters denote similar elements throughout the several views, FIGS. 1–2 show a safety transmitting device 10 which provides a signal to a motor vehicle 12 such as a school bus that is approaching a railroad crossing 14, when train 16 is also approaching the railroad crossing 14. The train 16 causes a vibrational energy 19 to be induced and transmitted along the track 18. A tuning fork 20 is mounted onto the track 18. As the train 16 approaches the tuning fork 20, the fork 20 begins to vibrate. A transmitter 22 located next to the tuning fork 20 converts the sound waves of the tuning fork 20 into electromagnetic or radio waves 24 which are transmitted forwardly towards the railroad crossing 14. The transmitting devices consisting each of the tuning fork 20 and transmitter 22 are positioned at a predetermined distance from the railroad crossing 14 such as 1–3 miles. The motor vehicle 12 is adapted to receive therein a receiver unit 26 which picks up waves 24 and converts them to an electrical impulse, which activates a flashing light unit 28 mounted in the interior of the vehicle 12 forwardly of the driver as shown in FIG. 3. The activation of unit 28 warns the driver of the approach of the train 16.

Figure 4:
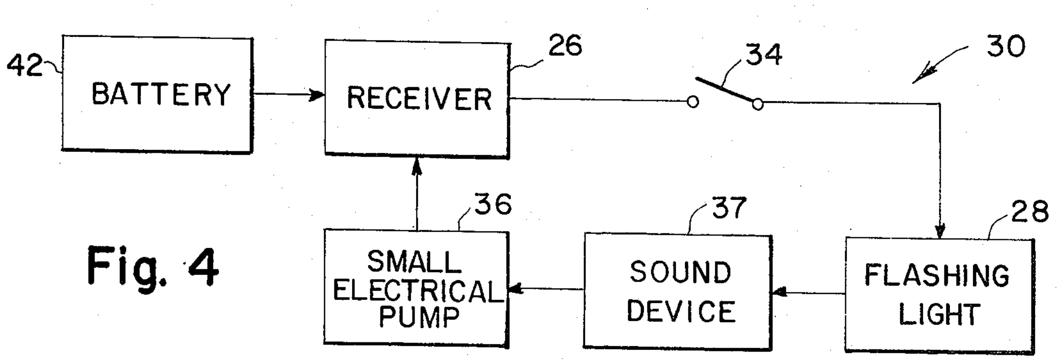
FIG. 4 illustrates an electric circuit of the receiver portion of the device.

FIG. 4 shows an electric circuit 30 of the device 10 which consists essentially of an on/off switch 34 which allows complete de-energization of the circuit 30, the receiver unit 26, the flashing light unit 28, a small electrical pump 36, and a sound device 37 such as a tape recorder for emitting an audio signal to the driver. A battery 42 of the vehicle 12 is wired to the receiver unit 26.

Referring back to FIG. 3 an electric pump 36 communicates with the brake line assembly 38. The closing of circuit 30 by the receiver unit 26 causes the pump 36 to pump fluid through the assembly 38 thereby providing automatic slow application of the brakes 40 so as to stop the vehicle. The sound device 37 is mounted in the interior of the vehicle 12. The waves 24 are emitted from the transmitter 22 in a pattern sufficient to intersect the moving vehicle at a distance of up to one half mile from the railroad crossing 14. If a motor vehicle 12 is on the crossing 14, switch 34 can be thrown to open circuit 30 so as to deactivate the pump 36 thereby allowing the vehicle 12 to cross to a point of safety.

Since obvious changes may be made in the specific embodiment of the invention described herein, such modifications being within the spirit and scope of the invention claimed, it is indicated that all matter contained herein is intended as an illustrative and not as limiting in scope.

Having thus described the invention, what I claim as new and desire to secure by Letters Patent of the United States is:

1. A safety transmitting device for warning motor vehicle approaching a railroad crossing of the simultaneous approaching of a train along the tracks, which comprises:

a. a tuning fork adapted to mechanically communicate with said tracks, a vibration of said tracks due to said train moving on said tracks introducing a vibration in said tuning fork, said tuning fork emitting sound waves therefrom and said tuning fork adapted to be located at a predetermined distance from said crossing;

b. a transmitter unit located next to said tuning fork for converting said sound waves from said fork to electromagnetic waves and transmitting said electromagnetic waves therefrom;

c. a receiver unit adapted to be received in said motor vehicle and to receive said electromagnetic waves;

d. a flashing light unit adapted to be received in an interior of said motor vehicle just forwardly of a driver; and e. an electric circuit of a battery of said motor vehicle, said flashing light and said receiver unit.

2. A device according to claim 1, wherein said circuit further includes an on/off switch.

3. A device according to claim 1, wherein said circuit further includes an electric pump adapted to be received in a brake line assembly of said motor vehicle.

4. A device according to claim 1, wherein said electric circuit further includes a sound device for emitting an audible signal to said driver, said sound device adapted to be mounted in said interior of said motor vehicle.

* * * * *